(No Model.)
W. W. WOOLSEY.
SANITARY ICE CHEST PAIL.
No. 313,463. Patented Mar. 3, 1885.
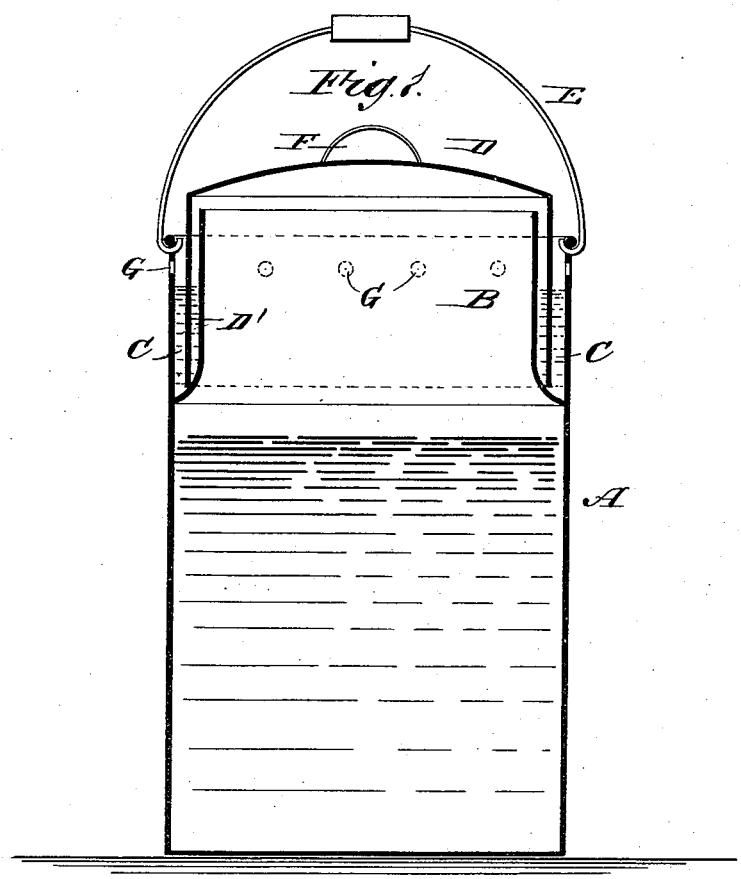
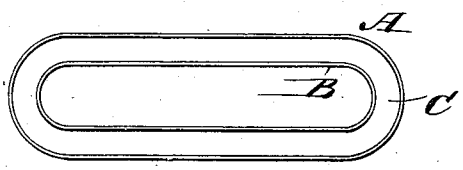
WITNESSES:
F. McArdle
C. Sedgwick
INVENTOR:
W. W. Woolsey
BY
ATTORNEYS.

UNITED STATES PATENT OFFICE.

WILLIAM W. WOOLSEY, OF AIKEN, SOUTH CAROLINA.

SANITARY ICE-CHEST PAIL.

SPECIFICATION forming part of Letters Patent No. 313,463, dated March 3, 1885.

Application filed October 17, 1884. (No model.)

*To all whom it may concern:*

Be it known that I, WILLIAM W. WOOLSEY, of Aiken, in the county of Aiken and State of South Carolina, have invented a new and Improved Sanitary Ice-Chest Pail, of which the following is a full, clear, and exact description.

The object of my invention is to provide a new and improved pail provided with a water-seal cover to protect the contents from contamination, and which pail is so constructed that it occupies but very little space in the refrigerator, and at the same time permits of the contents cooling very rapidly.

The invention consists in a flat pail provided at its top with a cup on the inner surface, whereby a trough is formed to receive water and form a seal for the cover. The top edge of the cup projects above the top edge of the pail, and the pail is provided with holes below the top edge, so that the water in the trough cannot flow into the interior of the pail.

Reference is to be had to the accompanying drawings, forming part of this specification, in which similar letters of reference indicate corresponding parts in both the figures.

Figure 1 is a longitudinal sectional elevation of my improved sanitary ice-chest pail. Fig. 2 is a plan view of the same.

The pail A is made quite flat—that is, it is made from one and one-half to about three inches in thickness, and of any desired or suitable height and width. At the upper end of the pail a cup, B, is secured on the inner surface, the top edge of the cup projecting above the top edge of the pail, whereby a trough, C, is formed between the cup and the pail for receiving water, forming a seal for the cover D, the downwardly-projecting part D' of which is passed into the said space between the pail and cup. The pail has a bail, E, and the cover a handle, F. A series of apertures, G, are provided in the pail A a short distance from the upper edge. The top edge of the cup B is placed higher than the top edge of the pail, to prevent the water from splashing over into the interior of the pail when the cover is placed on the pail carelessly or suddenly. I have also provided the apertures G to permit the water to flow off to the outside of the pail more readily when the cover causes the water in the seal-trough to overflow.

As the pail is made very flat it can be placed in between two blocks of ice and be in contact with both, or it can be placed in between the side of the ice-chest and a block of ice.

The seal of the cover prevents any contamination of the contents of the pail by foul air, gases, dust, &c.

The pail occupies comparatively little space in the ice-chest or refrigerator.

Having thus described my invention, what I claim as new, and desire to secure by Letters Patent, is—

1. The flat pail A, provided on its inner surface with a cup, B, at the top, whereby a trough for receiving water to form a seal is provided, the top edge of the cup projecting slightly above the top edge of the pail, substantially as herein shown and described.

2. The combination, with the pail A, having apertures G directly below the top edge, of the cup B, secured on the inner surface of the pail and projecting above the top edge of the same, substantially as herein shown and described.

WILLIAM W. WOOLSEY.

Witnesses:
W. J. PLATT,
C. K. HENDERSON.